United States Patent [19]
Ogasawara

[11] Patent Number: 5,006,771
[45] Date of Patent: Apr. 9, 1991

[54] METHOD AND DEVICE FOR CONTROLLING HEADREST

[75] Inventor: Hiromitsu Ogasawara, Akishima, Japan

[73] Assignee: Tachi-S Co., Ltd., Tokyo, Japan

[21] Appl. No.: 507,156

[22] Filed: Apr. 10, 1990

[51] Int. Cl.$^5$ .............................................. G05B 19/28
[52] U.S. Cl. .................. 318/568.1; 318/603; 318/466; 318/560; 297/403; 297/330; 297/408; 307/10.1
[58] Field of Search .................. 318/55, 15, 434, 443, 318/466, 467, 468, 469, 484; 280/808; 297/61, 65.1, 330, 374, 408, 391, 410, 409, 284, 403; 364/424.05, 174, 425

[56] References Cited

U.S. PATENT DOCUMENTS

| | | | |
|---|---|---|---|
| 3,912,939 | 10/1975 | Quantz et al. | 307/10.6 X |
| 4,222,608 | 9/1980 | Maeda | 297/410 |
| 4,401,928 | 8/1983 | Kamijo et al. | 318/466 |
| 4,446,380 | 5/1984 | Moriya et al. | 307/10.4 |
| 4,467,252 | 8/1984 | Takeda et al. | 318/603 |
| 4,486,806 | 12/1984 | Mochida et al. | 307/10.4 X |
| 4,645,233 | 2/1987 | Bruse et al. | 297/410 X |
| 4,709,776 | 12/1987 | Metz | 307/10.1 X |
| 4,711,494 | 12/1987 | Duvenkamp | 297/403 |
| 4,796,013 | 1/1989 | Yasuda et al. | 307/10.1 X |
| 4,797,824 | 1/1989 | Sugiyama et al. | 318/467 X |
| 4,807,934 | 2/1989 | Sakakibara et al. | 297/403 |
| 4,812,838 | 3/1989 | Tashiro et al. | 297/330 X |
| 4,896,050 | 1/1990 | Shin-Chung | 307/10.1 X |
| 4,924,162 | 5/1990 | Sakamoto et al. | 318/560 X |
| 4,924,163 | 5/1990 | Sakamoto et al. | 318/560 X |

*Primary Examiner*—Paul Ip
*Attorney, Agent, or Firm*—Oldham & Oldham Co.

[57] ABSTRACT

A method and device for controlling a headrest, in which the headrest is controlled its displacement between use and non-use positions as well as its fore-and-aft adjustment movement, through an automatic control system or a manual control system. A changeover switch is provided to select one of those automatic and manual control systems, and further, during operation of the automatic control system, the manual control system can be actuated simply by operating an associated manual adjustment switch. Additionally, a safety arrangements are included, which protects an occupant against the headrest which will contact him or her due to its erroneous operation.

6 Claims, 5 Drawing Sheets

METHOD AND DEVICE FOR CONTROLLING HEADREST

BACKGROUND OF THE INVENTION

1. Field of the Invention

The present invention relates to a method and device for controlling a headrest of an automotive seat so as to move the same to a non-use position where it is lowered away from the view field of an occupant on the seat, thereby enabling him or her to attain a good view over the seat back.

2. Description of Prior Art

There has been known a movable headrest for an automotive seat, which is moved by a motor under a switching control, so that the headrest body may adjustably be displaced to a use position upon the top of the seat back, where the headrest body erects thereon to readily support the head of an occupant sitting on the seat, or to a non-use position where the headrest body is located away from the forward view field of another occupant sitting on the other seast. Conventionally, in this sort of headrest device, an automatic operation switch is provided for effecting such headrest displacement with one-touch operation, and therefore, a driver on a front seat can operate this switch to cause a headrest on a rear seat to rotate forwardly below his or her backward sight line, to attain a good backward view field over the rear seat and further, an occupant sitting on the rear seat can cause the same displacement of a headrest on the front seat to a point below the forward sight line, by operation of the automatic operation switch, to secure a good forward view field over the front seat. On the other hand, the headrest body can be returned from that non-use position to the use position, through one-touch switching operation of the automatic switch.

In addition to this switch-type headrest control system, there has been known a well-computerized headrest control system, which automatically controls the movement of the headrest upon the seat back of the seat, responsive or sensitive to the degrees of running speed of the automobile, the opened/closed state of its door(s), some partial actions the automobile, or the ambient conditions in which the automobile runs along. According to such system, for instance, assuming that, during driving the automobile, with the headrest located at a use position, an increased speed of the automobile exceeding a predetermined one is detected by a speed sensor, then the headrest is automatically displaced from the use position to a non-use position away form the sight line of a driver or rear-seat occupant, without his or her operation of a partinet switch. Further, let us assume that the automobile is parked somewhere. With the headrest located at the non-use position, an occupant comes up to it and open the door, and such opening of the door is detected by a door switch. Then, there occurs an automatical return of the headrest from the non-use position to the use position upon the top of seat back, thus standing ready to support the head of the occupant. Accordingly, whenever entering the car, the headrest is always located at the use, head-supporting position that gives no hindrance or interference against the occupant intending to climb onto the seat.

However, such highly improved headrest control system has been solely directed to the displacement of the headrest between the use and non-use positions, and not designed to extend care towards an occupant on the assistant's seat next to the driver's seat as well as a rear-seat occupant on the rear seat. That is, the system does not permit theose occupant to effect the displacement of the headrest between the use and non-use positions and adjustment of the same in fore-and-aft position upon the seat back, as a result of which, occupant, excepting the driver, can not attain a desired position of the headrest for taking a better seating posture. Moreover, there would be such trouble that the displacement of the headrest to the non-use under switching operation of the automatic operation switch is to be interrupted by a signal from the door switch being turned on due to the opening of the door, and the the headrest is moved back to the non-use position against the wish of an original operator.

SUMMARY OF THE INVENTION

With the above drawbacks in view, it is a purpose of the present invention to provide an improved method and device for controlling a headrest, which permits for selectively effecting one of automatic and manual control of the headrest in a switch-over way.

In achievement of such purpose, in accordance with the present invention, basically, there are automatic headrest control system for causing automatic displacement of the headrest between the use and non-use position in response to a motion of the parts of an automobile, such as to the opening and closing of the door of the automobile, or to change of speed of the automobile, or the like, and manual headrest control system for allowing such displacement of the headrest between the use and non-use positions by operation of an automatic operation switch, and also permitting a fore-and-aft adjustment of the headrest relative to the seat back to be made by operation of a manual adjustment switch. Those two controls are selectively changed by a change-over switch. Moreover, according to the present invention the automatic control system at operation is automatically changed into the manual control system, upon operating either of the automatic operation and manual adjustment switches.

Accordingly, the manual headrest control is safely carried out automatically without interference from the automatic headrest control, be virtue of.

It is another purpose of the present invention to effectively protect an occupant against an erroneous movement of the headrest.

For such purpose, the present invention utilizes a seating detector, a door sensor, and door lock sensor, which are electrically connected with a central processing unit, in order to move or stop the headrest. The presence of the occupant on the seat having a headrest actuates the seating detector and CPU to prevent movement of the headrest to the non-use position. The closing of the door results automatically in causing the headrest to displace to the use position, only responsive to the seating detector detecting the absence of the occupant from the seat having the headrest. The opening of the door will cause the headrest to return from the non-use position to the use position, thus permitting entry of an occupant into the seat without interference of the headrest. Locking the door will automatically cause the displacement of the headrest to the non-use position, after ascertaining the absence of the occupant on the seat having the headrest.

Accordingly, while being automatically or manually controlled, the headrest is also controlled its safety movement in order to protect against damage or injury an occupant who sits the seat.

DETAILED DESCRIPTION OF PREFERRED EMBODIMENT OF THE INVENTION

Figure 1:
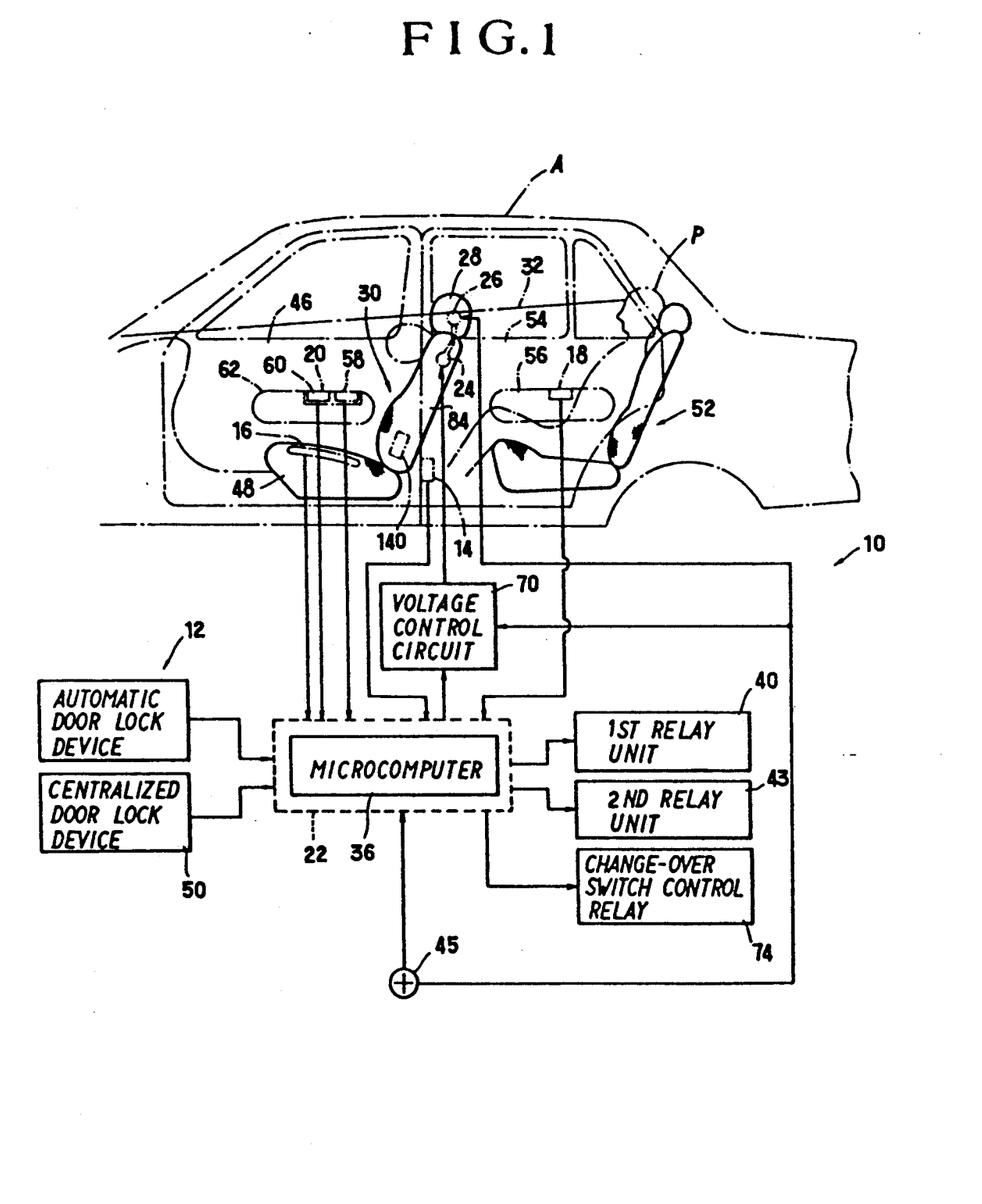
FIG. 1 is a schematic diagram of a headrest control in accordance with the present invention, with a block diagram.
Figure 2:
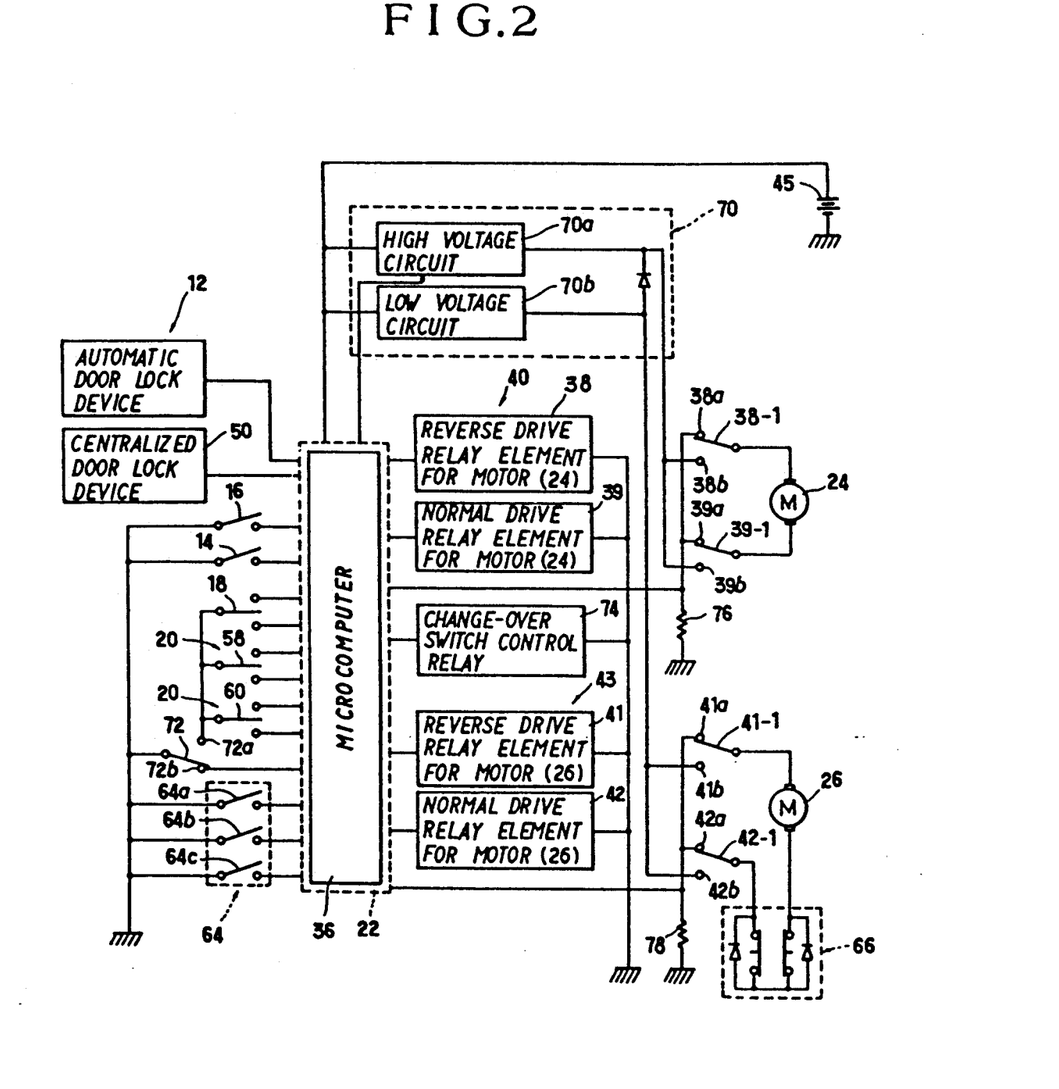
FIG. 2 is a block diagram showing an electric circuit for effecting the headrest control in accordance with the invention.

Referring to FIGS. 1 and 2, there is illustrated a headrest control device (10) for controlling a movement of a headrest (28) which is mounted on the top of the seat back (84) of an assistant's seat (30) provided in an automobile (A).

The headrest control device (10) is basically comprised of a speed detector (12) for detecting the running speed of the automobile (A), a door sensor (14) for sensing the opening or closing of a door of the automobile (A), a seating detector (16), an automatic operation switch (18), a manual adjustment switch (20), a central processing unit (22) to be referred to as "CPU", a headrest fore-and-aft motor (24), a headrest elevating motor (26), and relay units (40, 43).

As will become apparent later, the headrest body (28) is caused by the headrest fore-and-aft motor (26) to move forwardly and backwardly relative to the seat back (84), and caused by the headrest elevating motor (24) to move vertically relative to the seat back (84). Preferably, the two motors (24)(26) are DC geared motors.

Figure 3:
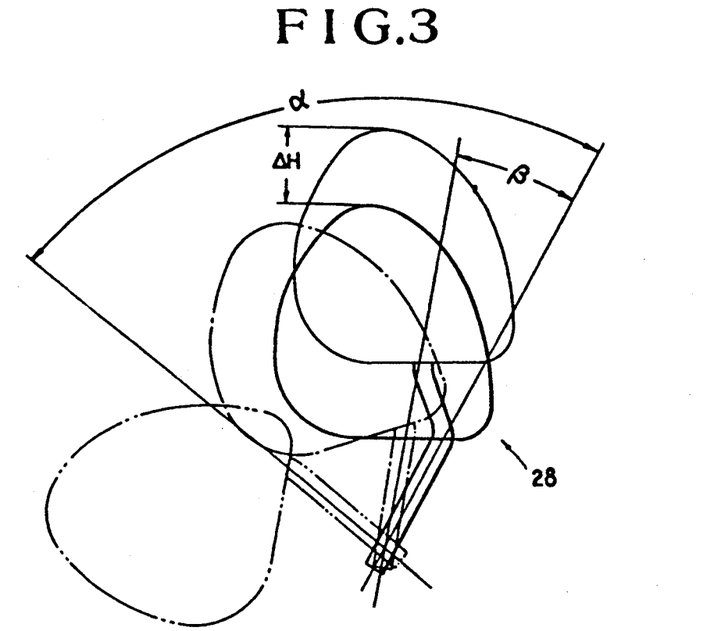
FIG. 3 is an explanatory diagram showing the motions of the headrest.

Referring to FIG. 3, at first, a description will be given as to the movements of the headrest body (28) in accordance with the present invention.

The headrest body (28) is to be displaced between an initial use position where it is located at a backward limit point and also at lower limit point upon the seat back (84), as indicated by the solid line which shows the lowered state of the headrest body (28), and a non-use position where the headrest body (28) is inclined downwardly and forwardly of the seat back (84) as indicated by the two-dot chain line (see also FIG. 5). precisely stated, the headrest body (28) is caused by the headrest fore-and-aft motor (24) to rotate between those use and non-use positions, and the associated rotation angle ($\alpha$) assumed by the headrest body (28) between the use and non-use positions is preferably 80 degrees. Further, as shown, the headrest body (28) is to be rotated adjustably between the initial use position and a forward limit point as indicated by one-dot chain line, by the drive of the same motor (24), so that the use position of the headrest body (28) my be adjusted upon the top of the seat back (84) in the forward and backward directions relative thereto. The fore-and-aft rotation angle ($\beta$) assumed in this headrest adjusting movement is preferably about 18 degrees.

The headrest (28) is to be raised and lowered in relation to the top of the seat back (84) at the distance ($\Delta H$) Stated otherwise, the vertical movement of the headrest body (28) is effected by the drive of the headrest elevating motor (26) only when the headrest body (28) is located within the fore-and-aft adjusting movement area upon the top of the seat back (84). Thus, insofar as the headrest (28) is located or set for movement between the initial use position and forward limit point upon the top of the seat back (84), the raising and lowering of the headrest body (28) may be effected in an adjustable way at any point within that fore-and-aft position. The distance ($\Delta H$) is preferably about 40 mm.

The headrest elevating and fore-and-aft motors (26)(24) are preferably a DC geared motor.

Figure 4:
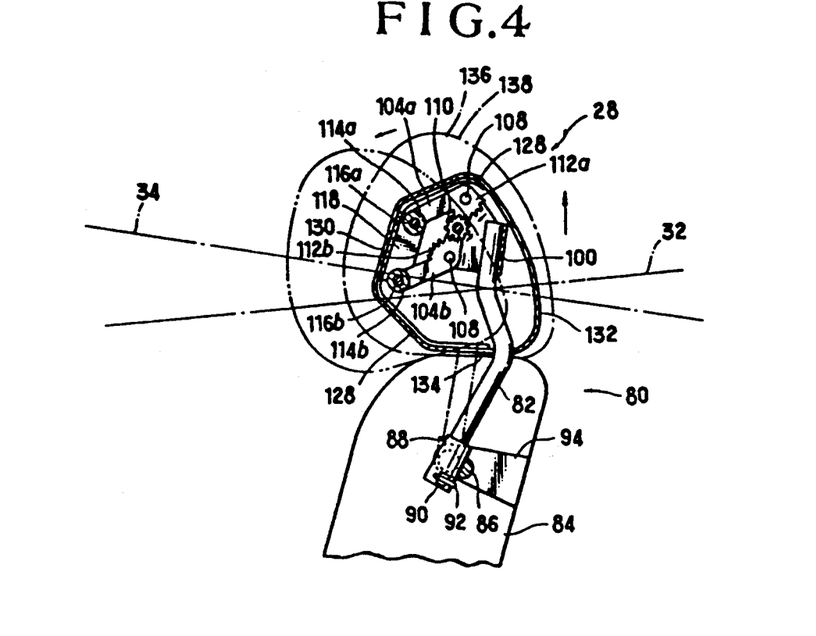
FIG. 4 is a longitudinally sectional view of a headrest showing its use position.
Figure 5:
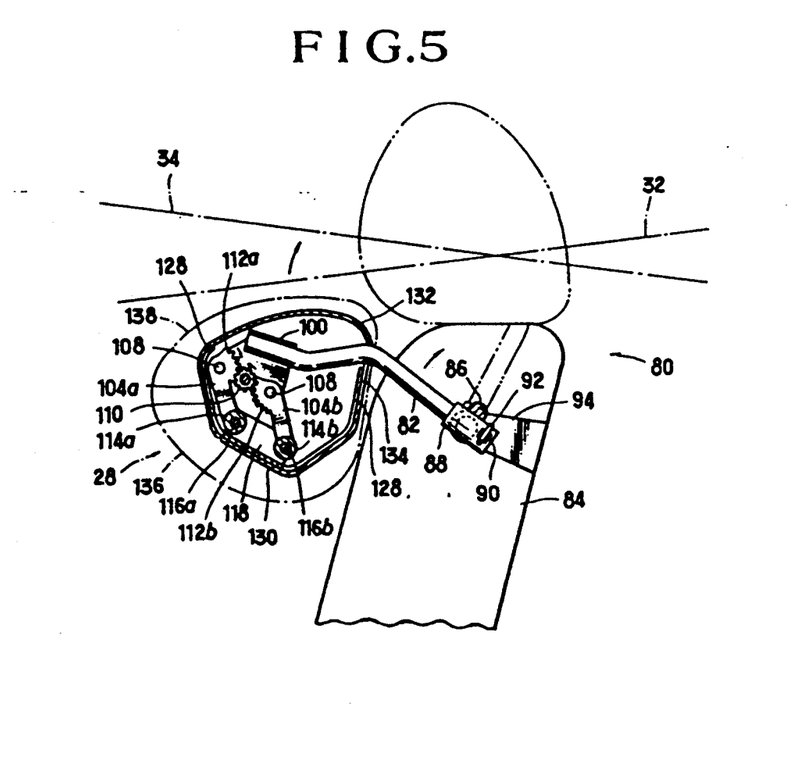
FIG. 5 is a longitudinally sectional view of a headrest, showing its non-use position.
Figure 6:
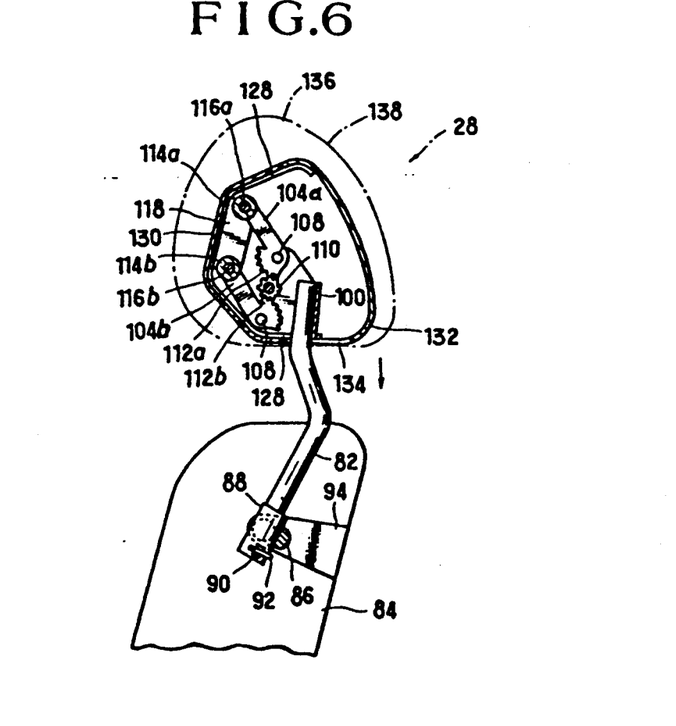
FIG. 6 is a longitudinally sectional view of a headrest, showing its uppermost limit level.

For facilitating the understanding, reference is now made to FIGS. 4, 5 and 6, in which FIG. 4 depicts the fore-and-aft movement of the headrest body (28) between the forward and backward limit points upon the top of the seat back (84), FIG. 5 depicts its displacement between the use position (at the backward limit point) and non-use position, and FIG. 6 indicates a vertical movement of the same headrest body (28) between the highest limit level and lowest limit level, showing particularly the headrest body (28) to be located at the highest limit level.

As can be seen from FIG. 5, the headrest body (28) is to be displaced to the non-use position as indicated by the one-dot chain line, below the forward sight line of a rear-seat occupant (P) extending from his or her eyes to the lower edge of the front glass of the automobile (A), so that he or she can attain a wide forward view field through the front glass of the automobile (A), without hindrance of the headrest body (28). (see FIG. 1)

The speed detector (12) is disposed at a suitable point where it can effectively detect the running speed of the automobile (A) and is connected electrically connected with the CPU (22), as shown in FIGS. 1 and 2. The speed detector (12) is so designed to detect a high speed of the automobile (A) over a given speed, and sends a signal, if it occurs, to the CPU (22). As seen in FIG. 1, the illustrated embodiment of the speed detector (12) is an automatic door lock device which is found in some of ordinary automobiles and locks the its door(s) in response to the speed of the car exceeding a given one, for a safety purpose. Utilizing such speed-change sensitivity of the conventional automatic door lock device, in the present invention, the lock device per se is electrically connected with the CPU (22) and sends a signal, when it detects a high speed in excess of a given one, to the CPU (22) which then emits a control signal, instructing the headrest fore-and-aft motor (24) to displace the headrest body (28) to the non-use position. Of course, the speed detector (12) is not limited to such door lock device, but may be a suitable car speed sensor or other speed sensing means. Nonetheless, the automatic door lock device is most preferable in view of its simple structure. The given speed, in excess of of which a signal is to be sent from the detector (11) the the CUP (22), is preferably about 20 km/h.

The CPU (22) includes a microcomputer (36) which has been programmed to properly deal with any data or signal sent form various elements and emits a suitable control signal for carrying out an intended motions in the present device (10).

As shown in FIG. 2, the first relay unit (40) is disposed between the CPU (22) and headrest elevating motor (24), and electrically connected with both of them, and the second relay unit (43) is disposed between the CPU (22) and headrest fore-and-aft motor (26), and electrically connected with both of them.

In the embodiment shown, the CPU (22) is connected with the positive pole of a battery (45).

In operation, referring to FIG. 5, let it be assumed that, with the headrest body (28) being located at the use position as indicated by the two-dot chain line, the automobile starts to run and increases its speed to the degree in excess of a given speed. Then, the automatic door lock device (12) is actuated, giving a signal to the CPU (22) which in turn emits a reverse drive control signal to the first relay unit (40) associated with the headrest fore-and-aft motor (24). The control signal is inputted to the reverse drive relay element (38), and responsive thereto, the associated relay contact (38-1) is set in contact with the make point (38a), while the other relay contact (39-1) is in contact with the brake point (39b). Thus, the motor (24) is energized to rotate in a reverse direction, causing the headrest body (26) to displace from the use position to the non-use position, via a headrest drive mechanism (80) to be described later. Accordingly, it is seen that the increase of the speed over a given one results in an automatic displacement of the headrest body (26) from the use position to the non-use position, so that the rear-seat occupant (P) attain a good forward view field without any manual operation.

The door sensor (14) is so disposed as to detect the opened or closed state of a front door (46) adjacent to the assistant's seat (30), and electrically connected with the CPU (22). Namely, the door sensor (14) is sensitive to the opening of the door (46) and in that case, the sensor (14) is activated, sending a signal to the CPU (22). Then, the CPU (22) emits a control signal for causing displacement of the headrest body (28) from the non-use position to the use position. Thus, the headrest body (28), which has been moved to the non-use position by the foregoing automatic speed-based control, may be returned to the use position, if the door (46) is opened. For example, referring again to FIG. 5, assuming that, with the headrest body (28) being located at the non-use position as indicated by the one-dot chain line, the door (46) is opened, then the door sensor (14) is activated, sending a signal to the CPU (22), which emits a normal drive control signal to the first relay unit (40). The corresponding normal drive relay element (39) is thereby actuated to set its relay contact (39-1) in contact with the make point (39a), while other relay contact (38-1) is contacted with the brake point (38b). Thus, the headrest fore-and-aft motor (24) is energized to rotate in a normal direction, thereby causing the headrest body (28) to return from the non-use position to the use position. Accordingly, it is seen that, when an occupant, who wishes to climb onto the assistant's seat (30), opens the door (46), the headrest body (28) located at the non-use position upon the seat back (84) of that seat (30) is automatically returned to the use position, so as to allow the occupant to easily sit on the seat (30) without interference of the headrest body (28).

In this context, the arrangement of the seating detector (16) in the seat cushion (48) of the assistant's seat (30) is much advantageous in securing the safety for such occupant sitting on the assistant's seat (30). The seating detector (16) is electrically connected with the CPU (22), and preferably it is a pressure sensitive switch, or an electrical capacitant switch. Specifically, when the presence of the occupant on the assistant's seat (30) is detected by the seating detector (16), a signal is sent from the detector (16) to the CPU (22), which then blocks a signal from the automatic door lock device (12). Hence, if the assistant's seat (30) is seated by an occupant, any signal being sent from the door lock device (12) is blocked by the CPU (22), so that the headrest body (28) is assuredly prevented from being moved to the non-use position, which might damage or injure that occupant on the assistant's seat (30).

In the illustrated embodiment, there is provided a centralized door lock device (50) at a door adjacent to a driver's seat (not shown) next to the assistant's seat (30), which is operable by a driver thereon in order to collectively lock or unlock all other door locks provide at the respective doors of the automobile (A) at one time in one-touch way. The centralized door lock device (50) is electrically connected with the CPU (22) with such an arrangement that the locking operation of the lock device (50) results in simultaneously causing the displacement of the headrest body (28) to the non-use position, when nobody is present on the assistant's seat (30). Specifically, upon effecting locking operation of such lock device (50), a signal is sent therefrom to the CPU (22), which then emits a reverse drive control signal to the first relay unit (40). Responsive thereto, the reverse drive relay element (38) is actuated to set its relay contact (38-1) in contact with the make point (38a), while the other contact (39-1) of the normal drive relay element (39) is in contact with the brake point (39b), thereby energizing the motor (24) to rotate in the reverse direction, whereby the headrest body (28) is moved forwardly of the seat back (84) into the non-use position.

In addition to the above-described automatic control of the headrest body (28), an occupant may conduct a manual control thereof by operating the automatic operation switch (18). Referring now to FIG. 1, the automatic operation switch (18) is disposed at the armrest (56) integral with the inner wall of the rear door (54) of the automobile (A). The automatic switch (18) is operable by the rearseat occupant (P) so as to control the drive of the headrest fore-and-aft motor (24) to cause the displacement of the headrest body (28) between the use and non-use positions, in a one-touch manner. Preferably, the switch (18) is a seesaw-type, self-returnable switch having a first switch area (18a) and second switch area (18b), and further a memory for storing provisionally the switch area being turned on. With such switch structure, to turn on the first switch area (18a) causes the headrest body (28) to move to the non-use position, whereas to turn on the second switch area (18b) causes it to move to the use position, and once turning on either of the two switch areas (18a)(18b), its "on" state is retained in memory to keep on the intended movement of the headrest body (28), to thereby avoid an unintentional or erroneous "on" operation of the switch (18) during a certain movement of the headrest body (28).

Upon turning on the first switch area (18a) of the automatic operation switch (18), the CPU (22), responsive to a signal therefrom, emits a reverse drive signal to the first relay unit (40), in which the relay contact (38-1) of the reverse drive relay element (38) is set in contact with the make point (38a), while the other contact (39-1) of the normal drive one (39) is contacted with the brake point (39b), whereby the motor (24) is driven in the reverse direction, to cause the headrest body (28) to move to the the non-use position. On the other hand, to turn on the second switch area (18b)of the same switch (18) will emit a normal drive signal through the CPU (22) to the first relay unit (40), and, responsive thereto, the relay contact (39-1) is then set in contact with the make point (39a), while the other contact (38-1) is in contact with the brake point (38a), so that the headrest body (28) is returned from the non-use position to the use position by virtue of the normal drive of the motor (24).

It should be noted that the foregoing use and non-use displacement of the headrest body (28) may be carried out, irrespective of such conditions that the automobile (A) is still running at a speed below the given one, or the centralized door lock device (50) is in an unlocked state. The rear-occupant (P) can, therefore, operate the automatic operation switch (18) at any time to cause the displacement of the headrest body (28) between the use and non-use positions. The automatic operation switch (18) may also be provided at an armrest integral with the front door (46), so that a driver can operate it as well.

The manual adjustment switch (20) includes a fore-and-aft adjustment switch element (58) and a vertical adjustment switch element (60), and is provided at an armrest (62) integral with the front door (46) adjacent to the assistant's seat (30). Each of the two switch elements (58)(60) is both a seesaw-type, self-returnable switch. As shown, the former switch element (58) has a first switch area (58a) and second switch area (58b), wherein the first switch area (58a) is for causing the forward movement of the headrest body (28) while the second switch area (58b) is for causing the backward movement of the same. Likewise, the latter switch element (60) has a first switch area (60a) for causing upward movement of the headrest body (28) and a second switch area (60b) for causing downward movement of the headrest body (28).

Specifically, those two adjustment switches (58) (60) are electrically connected with the CPU (22) and signals from the switches (58)(60) are inputted to the CPU (22) for a proper processing purpose to be set forth below.

By referring to FIG. 3, firstly an elaboration will be give with regard to the fore-and-aft adjustment switch element (58): if it is turned on at its first switch area (58a), the CPU (22), responsive to a signal therefrom, emits a reverse drive signal to the first relay unit (40), in which the contact (38-1) of the reverse drive relay element (38) is brought to contact with the make point (38a), while the (39-1) of the reverse drive relay element (39) is in contact with the brake point (39b), whereby the headrest body (28) is moved forwardly upon the top of the seat back (84) within a predetermined headrest adjustment angle range ($\beta$) by the reverse drive of the motor (24). During this movement, turning off the switch element (38) will turn the relay contact (38-1) into contact with the brake point (38b), deenergizing the motor (24) to stop its drive, and permit a desired location of the headrest body (28) against the head of occupant. The same goes for the other second switch area (58b) for backward adjustment of the headrest body (28). Briefly, to turn on the switch area (58b) brings the relay contacts (38-1)(39-1) into contact with the brake point (38b) and make point (39b) respectively, as opposed to the foregoing turning on of the first switch area (58a), whereby the motor (24) is driven in the normal direction to move the headrest body (28) backwardly within the range ($\beta$). The location of the headrest body (28) is adjusted by turning off the switch element (58) at a desired point. Accordingly, by turning on and off the fore-and-aft adjustment switch (58), the headrest body (28) may be adjusted in its fore-and-aft direction within the range ($\beta$) with respect to the seat back (84).

Referring again to FIG. 3, in accordance with the present invention, the displacement of the headrest body (28) between the use and non-use positions is limited within the range ($\alpha$), and the fore-and-aft adjustment range of the same is ($\beta$) as stated above. In order to set such ranges, there is provided a fore-and-aft limit switch (64) having a first limit point (64a), a second limit point (64b) and a third limit point (64c), all of them being electrically connected to the CPU (22). The first limit point (64a) corresponds to the initial use position of the headrest body (28) as indicated by the solid line where the headrest body (28) is shown as being located at both its backward limit point and lowest limit level. The second limit point (64b) corresponds to the forward limit point of the headrest body (28) as indicated by the one-dot chain line showing it to be forwardly inclined at its limit point. The third limit point (64c) corresponds to the non-use position as indicated by the two-dot chain line. Thus, while being moved forwardly and backwardly, the headrest body (28) is stopped at each of those three limit points (64a)(64b)(64c) automatically, so as to avoid an excessive movement of the headrest body (28) during the operation for executing its displacement between the use and non-use positions as well as its fore-and-aft adjustment. This ensures to protect an occupant sitting on the assistant's seat (30) against a damage or injury from an overrun of the headrest body (28). The limit switch (64) may be a potentiometer which measures the rotation angle of the headrest body (28) relative to the seat back (84).

The headrest body (28) is further adjustable in height within the above-mentioned fore-and-aft adjustment range ($\beta$) by operating the vertical adjustment switch (60). The vertical adjustment switch (60) includes a first switch element (60a) for causing the upward movement of the headrest body (28) and a second switch element (60b) for causing the downward movement of the same. The switch (60) is electrically connected to the CPU (22) and has an operational relation with the headrest elevating motor (26) via the second relay unit (43).

Specifically, if the switch (60) is turned on at its first switch element (60a), the CPU (22), respesive to a signal therefrom, emits a reverse drive signal to the second relay unit (43), in which a reverse drive relay element (41) is actuated to set its relay contact (41-1) in contact with the make point (41a), while the other contact (42-1) of a normal drive relay element (42) is contacted with the brake point (41b), thus energizing the motor (26) to drive in the reverse direction, to thereby cause upward movement of the headrest body (28). Reversely, if the second switch element (60b) of the switch (60) is turned on, then a normal drive signal is emitted from the CPU (22) to the second relay unit (43), in which the normal drive relay element (42) is actuated to set its relay contact (42-1) in contact with the make point (42a), while the other contact (41-1) of the reverse drive relay element (41) is contacted with the brake point (41b), thus energizing the motor (26) to drive in the normal direction, to thereby cause downward movement of the headrest body (28).

It is noted here that the vertical movement of the headrest body (28) is limited within a predetermined range of (ΔH) as shown in FIG. 3.

During the foregoing vertical movement, turning off the vertical adjustment switch (60) will cease the drive of the motor (26) to stop the headrest body (28) at a desired point. In that way, the headrest body (28) can be adjusted at a desired point within the vertical limit range of (ΔH).

Such vertical limit range (ΔH) is set by a vertical limit switch (66) which is disposed between the headrest elevating motor (26) and the relay contact (42-1) associated with the second relay unit (43), and electrically connected with them. The illustrated vertical limit switch (66) is a push-button type of switch incorporating therein diodes, and is provided within the headrest body (28) as will be explained later. It is therefore seen, although will be set forth, that the headrest body (28) is to be stopped at its lowest limit level or at its highest limit level, as seen from FIG. 3 by means of the vertical limit switch (66), to thereby prevent the headrest body (28) against overrun of excessive movement thereof at either of such limit level, thus serving to protect an occupant on the assistant's seat (30) against a damage or injury.

As shown in FIGS. 1 and 2, the device (10) of the present invention is provided with a voltage control circuit (70) adapted for increasing or degreasing a voltage supplied from the battery (45) for the purpose of changing the rotation rate (or speed) the the headrest fore-and-aft motor (24) into a high or low one. The voltage control circuit (70) includes a high-voltage circuit (70a) and a low-voltage circuit (70b). Through this circuit (70), a voltage being imparted to the motor (24) may be varied under a proper control of the CPU (22), depending upon a signal form the automatic operation switch (18) and manual adjustment switch (20). Namely, responsive to a signal from the automatic switch (18), an electricity is flowed through the high-voltage circuit (70a) to impart a high voltage to the motor (24), thus producing an increased drive thereof, while by contrast, responsive to a signal from the manual switch (20), a low voltage is imported to the motor (24) through the low-voltage circuit (70b), thus producing a decreased drive thereof.

With such motor drive rate changing system, it is appreciated that, when causing the displacement of the headrest body (28) between the use and non-use positions under operation of the automatic switch (18), the headrest fore-and-aft motor (24) is driven at a high rate, to effect a rapid movement of the headrest body (28) between the use and non-use positions, and when causing fore-and-aft adjustment of the headrest body (28) by operation of the manual switch (20), the same motor (24) is then driven at a low rate, to effect a slow movement of the headrest body (28) within the range (β), so that an operator can conduct a fine adjustment of the fore-and-aft position upon the top of the seat back (84) to attain an optimal head support state of the headrest body (28).

The headrest elevating motor (26) is electrically connected to the low-voltage circuit (70b) only, as shown in FIG. 2, so as to cause a low-rate drive of the motor (26), because the vertical adjustment of the headrest body (28) should be effected in a fine way for attaining a desired height point for supporting the head of occupant.

As readable from the above description, the movements of the headrest body (28) may be controlled by an automatic control system based on the automatic door lock device (12) (speed sensor), centralized door lock device (50) and door sensor (14), and a manual control system based on the automatic operation switch (18) and manual adjustment switch (20).

One control system out of those two control systems may be selected by a change-over switch (72). The change-over switch (72) is controlled by a change over switch control relay (74) which is electrically connected with the CPU (22), and has an automatic control-system switch point (72a) for putting into operative state those automatic lock device (12) and so forth, and a manual-control-system switch point (72b) for rendering operative those automatic and manual switches (18)(20). Normally, the change over switch (72) is turned on at the automatic-control-system switch point (72a), permitting the automatic control over the movements of the headrest body (28), but under such state if the automatic operation switch (18) or manual adjustment switch (20) is operated, the CPU (22) detects it and actuates the change-over switch control relay (74) to bring the contact (72-1) of the change-over switch (72) to contact with the manual-control-system switch point (72b), whereupon the headrest body (28) is permitted to be displaced between the use and non-use positions by operation of the automatic operation switch (18), or to be adjusted by operating the manual adjustment switch (20) for fine adjustment in its fore-and-aft or vertical direction. At this moment, the automatic control system is placed in an inoperative state to ensure letting such manual control system go on working.

In FIG. 2, designation (76) refers to a first over-current detecting resistance for preventing flow of an over-current into the headrest fore-and-aft motor (24), and designation (78) refers to a second over-current detecting resistance for preventing flow of an over current into the headrest elevating motor (26). If an over-current is emerged in the circuit, whether it occurs due to an overload upon the former motor (24) or the latter one (26), the CPU (22) detects the over-current through the first and second over-current detecting resistances (76)(78), and instructs those motors (24)(26) to cease its drive. In other words, if the headrest body (26) being moved is forcibly holded or pressed by an occupant, an overload is applied to the motor (24 or 26), producing an over-current, which is detected by the resistances (76 or 78), so that the motor is caused to stop by the CPU (22) for protection against an overheat or damages.

Reference is made to FIGS. 4 through 7, wherein is shown on preferred embodiment of headrest drive mechanism (80) for effecting the above-described fore-and-aft or vertical movements of the headrest (24). While other various mechanisms may be employed, a description will now be made of such headrest drive mechanism (56) as below.

Figure 7:
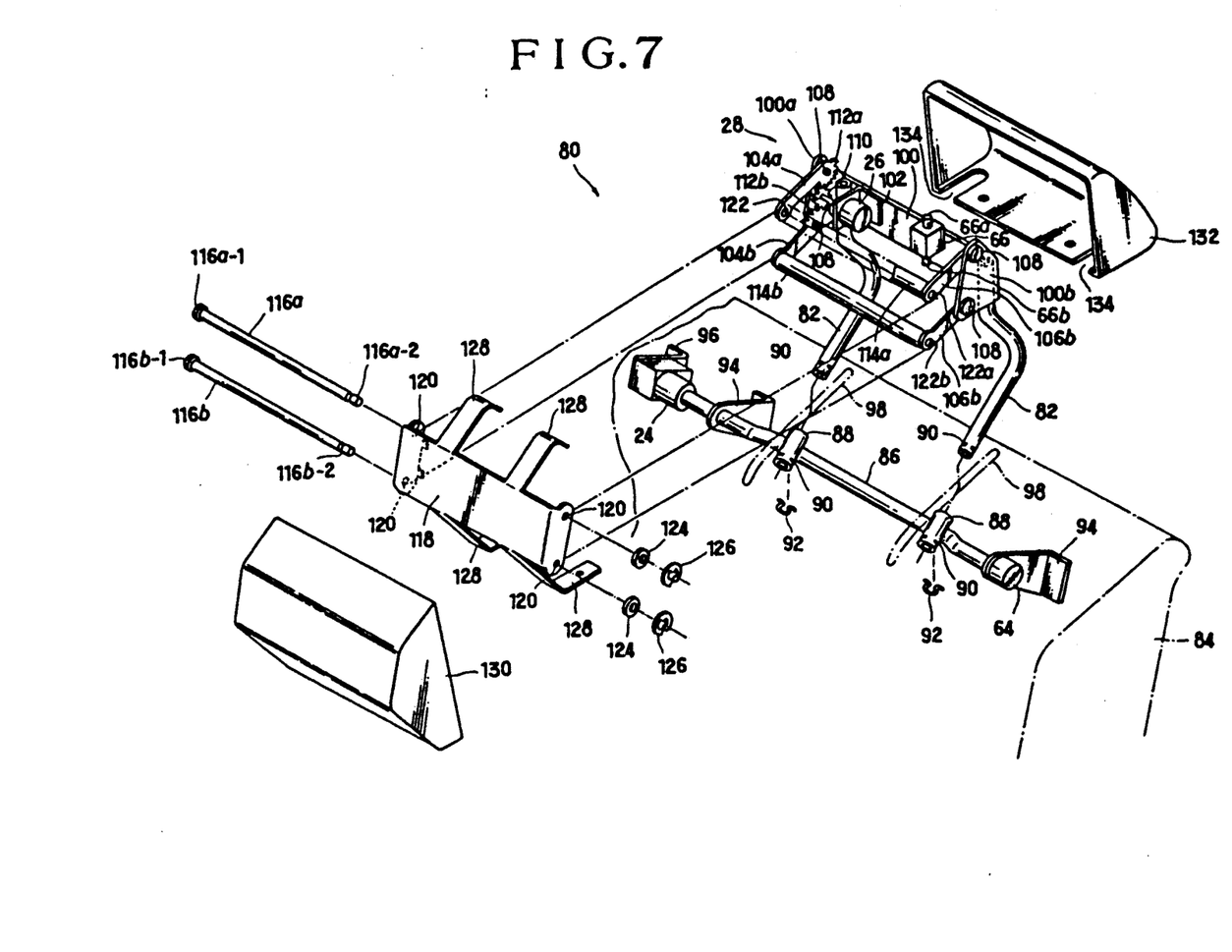
FIG. 7 is a partly broken, partially exploded perspective view of a headrest drive mechanism.

As shown in FIGS. 4 and 7, the headrest (28) is provided with a pair of headrest stays (82)(82) and mounted on the stays (82)(82) above the top of the seat back (84). The two stays (82)(82) are formed from a tubular material and supported at the seat back (84) such that their respective lower ends are inserted in the two holders (88)(88) and secured firmly thereto by means of the two Ω-shaped securing members (92)(92) which are each fitted in the cut-away portions (90)(90) of the holders (88)(88) respectively. The two holders (88)(88) are fixed on a support shaft (86) which are extended rotatably between a pair of spaced-apart brackets (94)(94) provided fixedly within the seat back (84). One end of the support shaft (86) is firmly connected to the drive shaft of the headrest fore-and-aft motor (24) which is supported by a bracket (96) within the seat back (84).

On the top of the seat back (84), as in FIG. 6, are formed a pair of slits (98)(98) in a direction along the fore-and-aft movement of the headrest stays (82)(82) so that the stays (82)(82) pass through the respective slits (98)(98) and are movable along the longitudinal direction of the slits (98)(98).

Accordingly, with this structure, the shaft (86) is caused to rotate by the drive of the headrest fore-and-aft motor (24) which causes simultaneous rotation of two stays (82)(82) and thus fore-and-aft rotation of the headrest body (28) relative to the seat back (84). For example, in this respect, let it be assumed that, under such use position of the headrest body (28) in FIG. 4, the CPU (22) outputs a reverse drive signal to the first relay unit (40), bringing the contact (38-1) of the reverse drive relay element (38) into contact with the make point (38a), while the other contact (39-1) of the normal drive relay element (39) is contacted with the brake point (38b). Then, the headrest fore-and-aft motor (24) is driven in the reverse direction, which causes likewise rotation of the shaft (86), thereby rotating the headrest body (28) forwardly relative to the seat back (84) into the non-use position as indicated by the one-dot chain line in FIG. 5 below the sight line (32) of the rear-seat occupant (P) (see also FIG. 1).

Assuming further that, under such non-use position of the headrest body (28), the CPU (22) outputs a normal drive signal to the first relay unit (40), then the contact (39-1) of the normal drive relay element (39) is set in contact with the make point (39a), while the other contact (38-1) is contacted with the brake point (38b), whereby the motor (24) is driven in the normal direction, causing rotation of the headrest body (28) clockwise from the non-use position to the use position as in FIG. 4.

The above-stated displacements of the headrest body (28) are limited by the previously described fore-and-aft limit switch (64). This switch (64) is provided at the right-side bracket (94), and has a rotatable contact (not shown) which is rotated with the rotation of the shaft (86) such as to travel among the first limit point (64a), second limit point (64b) and third limit point (64c) for switching on one of those three switch points (64a)(64b)(64c) so as to stop the headrest body (28) at one of the corresponding initial use position, forward limit point and non-use position.

Referring to FIG. 7, the headrest elevating motor (26) is disposed within the headrest (28); in other words, the headrest body(28) is fixedly supported by a motor bracket (102) fixed on a base bracket (100) which is extended fixedly between the upper end parts of the two headrest stays (82). The base bracket (100) is formed in a generally U-shaped configuration having two forwardly extending bent ends (100a)(100b). To the respective two ends (100a)(100b) of the base bracket (100), are pivotally connected two pairs of of parallel links (104a, 104b)(106a, 106b). In other words, the base ends respectively of the two pairs of parallel links (104a, 104b)(106a, 106b)are pivotally connected via pins (108) in a rotatable manner. As shown, the base ends of the left-side parallel links (104a, 104b) are respectively formed with upper sector gear (114a) and lower sector gear (114b), wherein there is interposed a pinion gear (110) between the two sector gears (114a)(114b) in mesh therewith, the pinion gear (110) being fixed to the output drive shaft of the headrest elevating motor (26). Further, an upper connecting pipe (114a) having a through-bore (122a) therein is fixedly extended between the free ends of the two upper link members (104a)(106a) whereas a lower connecting pipe (114b) having a through-bore (122b) therein is likewise extended between the free ends of the two lower link members (104a)(106b). A front bracket (118) is pivotally attached to all free ends of the two pairs of parallel links (104a, 104b)(106a, 106b) by means of two securing rods (116a)(116b). More specifically, the two securing rods (116a)(116b) are formed at their respective one ends with circular heads (116a-1)(116b-1), and are inserted through the front bracket (118) and connecting pipes (114a)(114b) such that the two rods (116a)(116b) are respectively inserted through the holes (120) of front bracket (118) as well as the through-bores (122a)(112b) of the two connecting pipes (114a)(114b), and at their respective free ends (116a-2)(116b-2) secured by means of securing members (124)(126) against removal through those holes and bores. The front bracket (118), as best seen in FIG. 7, has four mounting suPport members (128) to which are fixedly mounted a forward headrest frame half (130) and rearward headrest half (132) by means of suitable securing screws, whereupon there is produced a headrest frame within the headrest body (28). Of course, as understandable from FIGS. 4 to 6, the headrest frame thus formed from the two frame halves (130)(132) is covered with a padding (136) and covering member (138), presenting the headrest body (28). It is noted here that, as can be seen from FIG. 7, the rearward headrest frame half (132) is at its lower section formed with a pair of spaced-apart elongated cut-away portions (134)(134) in which the two headrest stays (82)(82) are respectively permitted to enter, thereby avoiding the interference of the frame against the movement of the stays (82)(82). Preferably, the electrical wiring of the headrest elevating motor (26) should be protected by a harness or the like and disposed within the stay (82).

Accordingly, with the above-described structure, the drive of the headrest elevating motor (26) causes rotation of the pinion gear (110) which in turn rotates the two sector gears (112a)(112b) thus causing vertical rotation of the two pairs of parallel links (104a, 104b)(106a, 106b) about the respective rotation centers at the numerals (108). Consequently, the headrest frame (130)(132) is raised or lowered, thus producing the vertical movements of the headrest body (28). In this respect, looking at FIG. 4, let us assume that, under such initial use position of the headrest body (28), the CPU (22) outputs a reverse drive signal to the second relay unit (43) for the headrest elevating motor (26). Then, the relay contact (41-1) of the reverse drive relay element (41) is set in contact with the make point (41a), while the other contact of the normal drive relay element (42) is contacted with the brake point (42b). This reverse drive relay action energizes the motor (26) to drive in the reverse direction, with the result that the pinion gear (110) is rotated counterclockwise, causing the synchronized rotation of the two sector gears (112a)(112b) to produce rotative upward movement of the parallel links (104a, 104b, 106a, 106b) in a clockwise direction, and thus the headrest body (28) is raised as shown in FIG. 6.

Assuming further that, with the headrest body (28) being located at such upward limit point as in FIG. 6, the CPU (22) outputs a normal drive signal to the second relay unit (43) for the headrest elevating motor (26). In that case, the relay contact (42-1) of the normal drive relay element (42) is set in contact with the make point (42a), while the other contact (41-1) of the reverse drive relay element (41) is contacted with the brake point (41b). Then, the motor (26) is driven in the normal rotation, which simultaneously rotates the pinion gear (110) clockwisely, causing synchronized rotation of the two sector gears (112a)(112b) to produce rotative downward movement of the parallel links (104a, 104b, 106a, 106b) in a counterclockwise direction, whereby the headrest body (28) is lowered as shown in FIG. 4.

Such vertical movements of the headrest body (28), as previously stated, are limited within the given range ($\Delta$H) (see FIG. 3) to provide proper uppermost and lowermost limit level, by means of the vertical limit switch (66).

The vertical limit switch (66) is a push-type switch having a pair of upper and lower switch-over knobs (66a)(66b) as shown. It is preferable that the switch (66) is fixedly provided on the base bracket (100) and disposed such that its upper switch-over knob (66a) is to be depressed by the upper mounting support member (128) when the headrest (28) is raised to an uppermost level, whereas the lower switch-over knob (66b) is to be depressed by the lower mounting support member (128) when the headrest (28) is lowered to a lowermost level. However, the vertical limit switch (66) is not necessarily restricted to that arrangement, but may be arranged in any other proper. Hence, when the headrest (28) reaches a predetermined uppermost level, the depression of the upper switch-over knob (66a) by its contact with the mounting support member (128) actuates the limit switch (66) to turn the working relay contact (41-1) of the reverse drive relay element (41) into contact with the brake point (41b) from the make point (41a), deenergizing the motor (26) at work so as to stop the upward movement of the headrest body (28). Reversely, when the headrest body (28) reaches a given lowermost level, the lower switch-over knob (66b) is depressed by the mounting support member (128), actuating the limit switch (66) to turn the working relay contact (42-1) of the normal drive relay element (42) into contact with the brake point (42b), thus deenergizing the motor (26) at work so as to stop the downward movement of the headrest body (28). Accordingly, with such vertical limit switch (66), the headrest body (28) is moved vertically within the range ($\Delta$H) relative to the seat back (84) without excessive vertical movement beyond that. This vertical limit mechanism is not limited to the shown one, but instead thereof, the over-current detecting resistance (78) may be used as a limit switch means, together with a stopper for preventing excessive movement of the headrest body (29), so that an over-current, which is emerged due to an overload upon the motor (26) being forcibly stopped by the stopper, is detected by the resistance (78), and the CPU (22) then instructs the motor to cease its drive.

In FIG. 1, designation (140) presents a control container that may be used for containing the CPU (22), and is preferably provided within the rear-seat back(SB).

Finally, it should be understood that the present invention is not limited to the illustrated embodiment, but any other modifications, replacements and additions may structurally be possible without departing from the spirit and scope of the appended claims.

What is claimed is:

1. A method for controlling a headrest in automobile in which said headrest is movably mounted on a seat such as to be movable between a use position for supporting a head of an occupant on said seat and a non-use position below a sight line of another occupant on another seat in said automobile to attain a good view field, and in which said headrest is automatically controlled its movement between said use and non-use positions, responsive to a speed of said automobile, opened/closed state of a door of said automobile and operating state of mechanical or workable parts in said automobile, thereby establishing an automatic control of said headrest, said method comprising the steps of:
   permitting a manual control for causing said headrest to move between said use and non-use position by operation of an automatic operation switch;
   permitting a manual adjusting control of said headrest at least in one of its fore-and-aft adjustment and vertical adjustment, by operation of a manual adjustment switch;
   responding to said operation of said automatic operation switch and manual adjustment switch; and,
   then, changing said automatic control to said manual controls of said headrest.

2. The method according to claim 1, wherein said method further comprises the steps of:
   detecting presence or absence of said occupant on said seat;
   ascertaining the absence of said occupant on said seat and automatically actuating a door lock device to lock said door in response to said speed of said automobile being increased to a degree in excess of a predetermined speed; and
   then automatically displacing said headrest from said use position to said non-use position.

3. The method according to claim 2, wherein said door lock device includes an automatic door lock device and a centralized door lock device, and wherein after ascertaining the absence of said occupant, one of said two door lock devices is automatically actuated to lock said door in response to said speed of said automobile being increased to a degree in excess of a predetermined speed.

4. A device for controlling a headrest in which said headrest is mounted on a top of a seat back of a first seat in an automobile and is movable between a use position for supporting a head of a first occupant on said first seat and a non-use position below a forward or backward sight line of a second occupant on a second seat in said automobile, said device comprising:
   a central processing unit which receives signal, processes it, and emits a proper control signal for controlling said headrest;
   a motor for causing said headrest to move between said use and non-use positions, said motor being electrically connected with said central processing unit;
   a seating detector which detects presence or absence of said first occupant on said first seat, said seating detector being electrically connected with said central processing unit;

an automatic control system which is electrically connected with said central processing unit, said automatic control system including a speed sensor and door lock sensor and being so arranged that, when absence of said first occupant at said first seat is detected by said seating detector, said automatic control system is actuated automatically to cause displacement of said headrest from the use position to the non-use position in response to said speed sensor detecting increase of speed of said automobile over a given speed and in response to said door lock sensor detecting a locked state of a door of said automobile;

a manual control system which is electrically connected with said central processing unit, said manual control system including an automatic operation switch and a manual adjustment switch, wherein said automatic operation switch is readily accessible and operable by said second occupant on said second seat in order to control said motor to cause displacement of said headrest between said use and non-use positions, and said manual adjustment switch is readily accessible and operable by one of said first and second occupants in order to control said motor to adjust a fore-and-aft position of said headrest within said non-use position; and a change-over means for selectively actuating one of said automatic and manual control systems, in response to operation of said automatic operation switch and manual adjustment switch;

whereby, if said first occupant is not present on said first seat, and said automatic operation and manual adjustment switches are left inoperative, said automatic control system is permitted to actuate for automatically displacing said headrest from said use position to said non-use position, whereas if said automatic operation and manual adjustment switches are operated, with said first occupant being absent from said first seat, then said change-over means turns an operative status from said automatic control system to said manual control system, to thereby permit manual operation of both said automatic operation and manual adjustment switches in order to manually cause displacement of said headrest between said use and non-use positions as well as to manually effect adjustment in said fore-and-aft position of said headrest.

5. The device as defined in claim 4, wherein said first and second seats are respectively a front seat and rear seat, wherein said speed sensor comprises an automatic door lock device which locks said door in response to said automobile speed increasing over a given speed, and wherein said door lock sensor comprises a centralized door lock device.

6. The device as defined in claim 4, wherein said device further comprises a second motor for causing vertical movement of said headrest, and wherein said second motor is controlled by operation of said manual adjustment switch so as to effect a fine adjustment in a vertical position of said headrest relative to said seat back of said first seat.

* * * * *